UNITED STATES PATENT OFFICE.

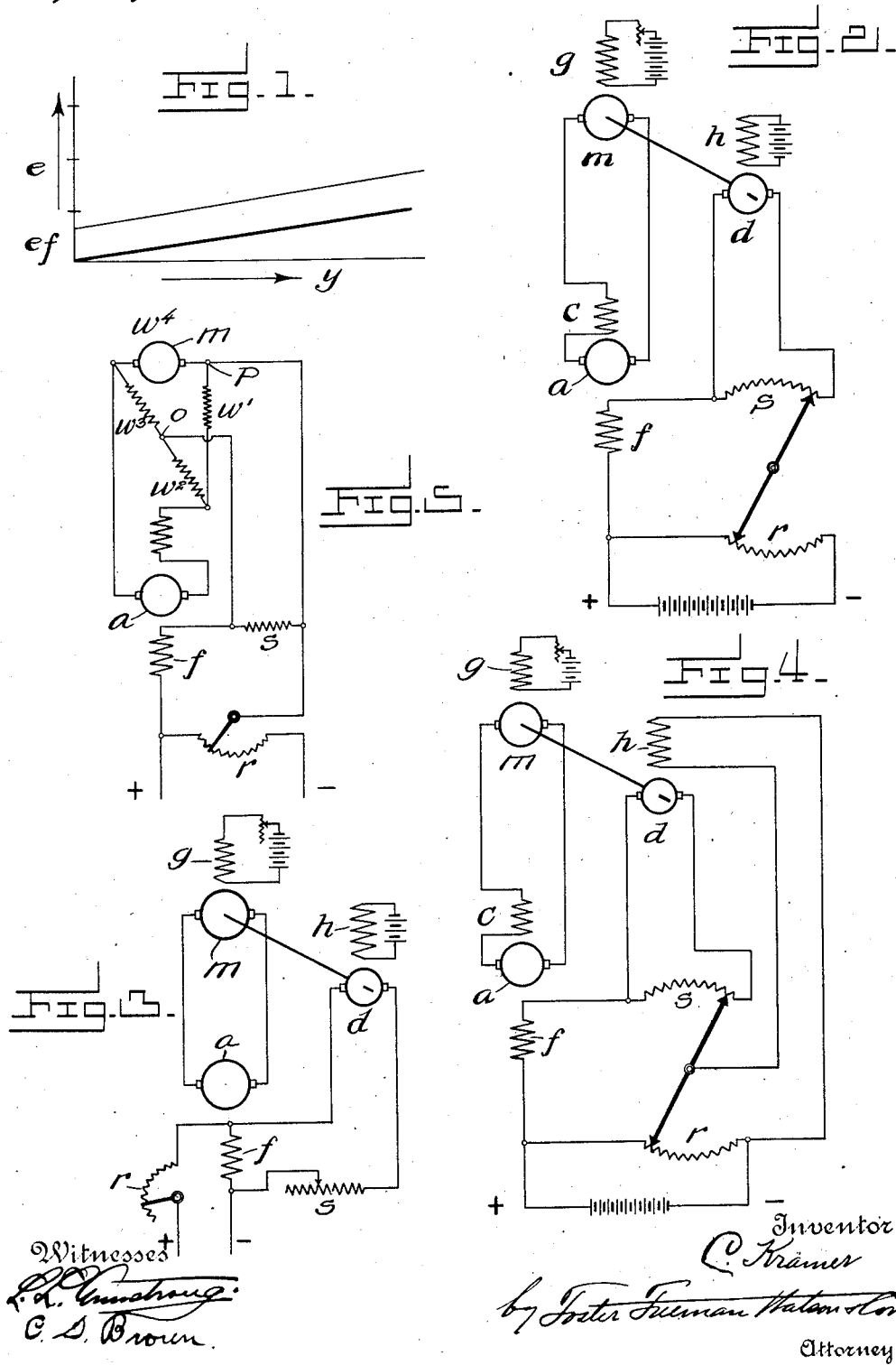

CHRISTIAN KRÄMER, OF FRANKFORT-ON-THE-MAIN, GERMANY, ASSIGNOR TO THE FIRM OF FELTEN & GUILLEAUME-LAHMEYERWERKE AKTIEN-GESELLSCHAFT, OF FRANKFORT-ON-THE-MAIN, GERMANY.

SYSTEM FOR CONTROLLING ELECTROMOTORS.

1,048,548.  Specification of Letters Patent.  Patented Dec. 31, 1912.

Application filed March 11, 1910. Serial No. 548,738.

*To all whom it may concern:*

Be it known that I, CHRISTIAN KRÄMER, a subject of the German Emperor, and a resident of Frankfort-on-the-Main, Germany, have invented certain new and useful Improvements in Systems for Controlling Electromotors, of which the following is a specification.

This invention relates to improvements in a system for controlling electromotors by means of the Leonard connection. And it consists in the matters described hereinafter and particularly pointed out in the appended claims.

For the purpose of explaining the invention several examples embodying the same have been shown in the accompanying drawings, in which the same letters of reference have been used in all the views to indicate corresponding parts.

In said drawings Figure 1, is a diagram illustrating the effect of a compound winding in a Leonard connection, whereby an electromotive force is produced which balances the electromotive force consumed in the resistances of the system, Fig. 2, is a diagrammatical view of the improved system in which controlling means for the excitation of the shunt field are provided, Fig. 3, is a diagrammatical view of a modification of the system shown in Fig. 2, in which the field excitation is changed, Fig. 4, is a diagrammatical view of a modification of the systems shown in Figs. 2 and 3, in which means are provided for weakening or short-circuiting the field winding of the controlling dynamo, and Fig. 5, shows a further modification of the systems illustrated in Figs. 2 to 4, in which the controlling generator is dispensed with, and in lieu thereof the electromotive force of the driving motor is used as a controlling electromotive force.

As is well known in the art, by means of the Leonard connection the speed of electromotors can be regulated within large limits, and the said regulation is almost independent of the load of the motor, because the electromotive force of the starting dynamo is increased at a rate which is proportional to its excitation. This regulation which is sufficient in most cases is affected merely by the residual magnetism of the starting machine and by the loss in the voltage which takes place in the starting machine, in the circuit, and in the armature of the driving motor. In most cases the effect of these influences is very small. But in some cases in which the regulation must be very accurate, for example in motors for driving paper making machines, motors for driving armored turrets, and the like, the said influences are objectionable. The reason for this will be readily understood from the following consideration: If the loss in voltage be assumed to be 5%, with a field excitation of 5% the unloaded motor will have a speed which is equal to 5% of the maximum speed, while the motor when under its full load will be at rest, because the current of the full load consumes the 5 per cent. of the electromotive force in the resistances of the circuit. This objection can be avoided by providing a compound machine the series winding of which is traversed by the current in the main circuit and which produces so much electromotive force as corresponds to the voltage consumed in the resistances of the circuit. The effect of the said compound winding is illustrated in Fig. 1 of the accompanying drawings. In the said figure the ordinate indicates the electromotive force of the starting machine as a function of the strength of the current. The heavy line indicates the electromotive force which is produced by the series field, and which therefore rises at a rate proportional to the current. If the value of the said electromotive force were increased exactly at the same rate as the loss in voltage is increased upon an increase of the current, a state of equilibrium would be produced for each value of the current. If to the electromotive force of the shunt or main field the said electromotive force of the series field is added which in the diagram has been indicated by the letters *e f*, the driving motor must have the same speed for each strength of the current and therefore under any load, because then its speed depends exclusively on the electromotive force of the shunt excitation.

If it were possible to construct a machine in which there is no remanence whatever, such a machine would work satisfactorily. However, as there is no such machine, a machine of the construction indicated is too unstable by reason of its remanence, so that it can not be securely controlled near the lower limits, and particularly can not be stopped, even if the value of the shunt excitation be zero. In order to assure a satisfactory operation, in such apparatus the value of compounding was held considerably below the value which would have been necessary in order to compensate the ohmic loss in voltage, and in order to completely stop the entire apparatus it was necessary to break the main circuit.

The object of the present improvements is to provide a system in which the aforesaid injurious influences are avoided. For this purpose a controlling device is provided which independently of the main current tends to hold the speed of the driving motor exactly equal to the value which it must have by reason of the excitation of the shunt field, and which in case of a divergence automatically regulates the shunt field. Fig. 2 shows a diagrammatical view of a system embodying the invention. The starting machine has been indicated by the letter $a$, its compound winding by the letter $c$, its shunt or main field winding by the letter $f$, the regulating device for the latter by the letter $r$, and the driving motor by the letter $m$. The field winding $g$ of the latter is separately excited.

To the driving motor $m$ a generator $d$ is coupled the field $h$ of which is also separately excited and which is always under its full excitation. Independently of the current consumed by the motor $m$ the generator $d$ produces an electromotive force which is exactly proportional to its speed. Thereby a means is provided by which to examine whether or not the electromotive force of the generator has a value which is exactly proportional to the field exciting current of the starting machine $a$. If this is not the case, the difference between the actual value of the electromotive force and that which it should have is made use of to influence the said current of the field winding. For this purpose a differential instrument may be provided which is acted upon by the electromotive force of the generator $d$ and the value of the current of the field winding, and coöperates with an automatic regulating device for varying the current of the field excitation.

A further method consists in providing a rheostat in the circuit of the field winding and regulating the loss of voltage in the said rheostat by means of the controlling generator in such a way that a balancing current is set up whenever the aforesaid values are not the same. This balancing current can be used for changing the field for example by causing the same to flow through the shunt field winding $f$ or through a second subsidiary field winding of the starting generator. Fig. 2 shows an example in which the balancing current is caused to flow through the shunt field winding $f$, and this example will now be described.

The resistance $r$ is connected to a source of electric energy. To the positive pole of the said source there are connected the field winding $f$ and in series therewith a rheostat $s$ which is adapted to be connected to the rheostat $r$ by means of the regulating device. In the example shown the source of electricity consists of a battery which may have a strength of 100 volts. If the rheostat $r$ has a resistance of 100 ohms, the field winding a resistance of 50 ohms, the rheostat $s$ also a resistance of 50 ohms, and if the regulating lever is so set as to divide the resistance of the rheostat $r$ in the proportion of 99 to 1, the current passing through the field winding $f$ and the rheostat $s$ is about one hundredth of that which passes through the rheostat $r$, that is about 0.01 ampere. This current causes a loss in voltage within the rheostat $s$ which amounts to 0.5 volt. If the motor $m$ and therefore also the generator $d$ revolve exactly at such a speed, as to produce an electromotive force of 0.5 volt, there will be no balancing current. If however the remanence of the starting machine acts for example in a negative sense, and the motor is at rest, the generator $d$ does not produce any electromotive force at all and it acts as if the rheostat $s$ were short-circuited. Therefore the current of the field winding is increased to about its double value, and the electromotive force will be affected in such a way, as to cause the motor to start.

If however the remanence acts in a positive sense, and the speed of the motor is above the normal, the electromotive force produced by the generator will be more than 0.5 volt, so that the current of the field winding $f$ is reduced and the speed of the motor is likewise reduced by the decrease of the excitation of the starting machine $a$.

It appears therefore, that the effect of the arrangement is to bring the speed of the motor $m$ in harmony with the exciting current of the shunt field winding $f$ of the starting machine $a$, and that the said effect is so much the greater the greater the ratio of the resistance of the rheostat $s$ to the ohmic value of the field winding $f$ is. This consideration is the reason for the arrangement shown in Fig. 2; but it should be understood, that the example shown is not a prerequisite for the desired effect. When the starting machine $a$ is excited to its full capacity, the correcting means is not required, because then the percentage differences are naturally small. It can therefore gradually be thrown out of operation the more the excitation approaches this maximum value. On the other hand the system is the more effective the higher for small excitations the resistance of the rheostat $s$ is. Therefore the arrangement shown in the figure is preferably used, in which upon an increase of the excitation of the field winding $f$ the resistance of the rheostat $s$ is reduced, while upon a decrease of the excitation of the field winding $f$ the said resistance is increased. This arrangement is also advantageous since in case of full speed the controlling generator $d$ has to supply a comparatively small amount of energy, and on the other hand in case of full excitation the exciting energy of the field can also be kept small, because in this case no energy is wasted in rheostats. It is of minor importance from whence the controlling electromotive force is supplied, and instead of being taken from a special generator which is driven by the motor $m$, it might just as well be produced by means of a special winding provided on the motor.

The arrangement so far described can be modified by controlling the field of the starting machine in such a way, that upon an increase of the load the field of the starting machine is weakened, so that the strength of the current can not be increased beyond a certain maximum value. An example of such a system is shown in Fig. 3 of the drawings. As shown the starting machine $a$ is directly connected with the working motor $m$. To the latter the controlling generator $d$ is coupled which may also be separately excited. The field $f$ of the starting generator $a$ can be excited to any intensity by means of a rheostat $r$. Through the intermediary of an adjustable rheostat $s$ the controlling generator $d$ is so connected to the field $f$, that at a certain number of revolutions its voltage corresponds to the voltage at the terminals of the field winding $f$.

The operation of the system is as follows: While the motor $m$ is under its normal load, it will assume such a speed under the influence of the starting generator $a$ or the excitation of the same that the voltage of the controlling generator $d$ substantially balances the voltage of the field. If the motor has its maximum speed, and only its load is abnormal, its speed is decreased. By this decrease in the number of revolutions the voltage of the controlling generator $d$ is decreased, and a branch current which under normal conditions passes through the field winding $f$ traverses the controlling generator $d$. Thereby the intensity of the field $f$ is decreased. The speed of the working motor is further reduced, and the parts can be so arranged, that for a certain maximum current the motor is stopped. This is the case if the resistance of the circuit of the controlling generator is such that when the controlling generator is at rest only so much current traverses the field winding $f$ as is necessary for producing the desired maximum current.

In the examples illustrated in Figs. 2 and 3 the subsidiary generator $d$ which supplies the controlling electromotive force and is driven by the motor $m$ must be constructed in such a way that it produces a comparatively high voltage for a small number of revolutions. And at full speed it must produce a multiple of the said voltage, which value is so much the higher the more the resistance of the rheostat $r$ of the controlling generator $a$ differs from that of the rheostat $s$ which is included in the exciting circuit and is connected to the controlling generator $d$. However such a voltage which is produced at full speed is objectionable by reason of the difficulty of insulation. Therefore the system is preferably so arranged that the field $h$ of the controlling generator $d$ is weakened at high speeds, and if desired completely thrown out of operation at the maximum speed. A system arranged according to this principle is shown in Fig. 4. The field winding $h$ of the controlling generator $d$ connected with the motor $m$ is not excited by a constant electromotive force, but its exciting voltage is decreased the more the speed of the motor $m$ and of the controlling generator $d$ is increased.

The reduction of the exciting voltage of the controlling generator $d$ can be effected in a simple way by supplying the exciting electromotive force over a part of the resistance of the rheostat $r$ the other part of which controls the exciting voltage for the field winding $f$ of the starting generator $a$.

The subsidiary generator which has been used in the systems described in Figs. 2 to 4 for obtaining an exact harmony between the excitation of the starting machine $a$ and the speed of the driving motor $m$ can be dispensed with by using the electromotive force of the driving motor $m$ produced by the movement within the field as controlling electromotive force. In systems heretofore designed this electromotive force could not be used, because the voltage at the terminals does not merely depend on the number of revolutions, but is also a function of the ohmic loss in voltage. By using a connection of the character of a Wheatstone bridge this objection can be removed.

As shown in Fig. 5 of the drawings a bridge is formed of the resistance $w^1$ of the circuit, the resistance of the armature of the motor $w^4$, and the resistances $w^2$ and $w^3$. Obviously between the points $o$ and $p$ there can be no difference in potential as long as the resistances are properly balanced and the armature of the motor is at rest, and it is immaterial what current passes through the armature of the motor. When the motor rotates a voltmeter connected to these points shows a voltage which corresponds to the counter-electromotive force of the armature of the motor. To the points $o, p$ a resistance $s$ is connected which is in series with the field winding $f$.

Different from the Wheatstone bridge in which the points $o$ and $p$ have the same potential when the bridge is balanced the ratio of the resistances $w^3$ and $w^2$, and the resistance $w^1$ are such, that between the points $o$ and $p$ there is such a voltage, that the loss in voltage caused in the resistance $s$ by the field current of the starting machine is exactly balanced, as long as the speed of the motor $m$ is exactly proportional to the field excitation of the starting dynamo $a$, so that there is no balancing current in the circuit connecting the points $o$ and $p$ to the exciting circuit $f$. If however the speed of the motor, by reason of its remanence or other conditions, should not be exactly proportional to the loss in voltage caused in the resistance of the starting generator $a$, a balancing current is set up which strengthens the field $f$ if the speed of the motor is too small, and which weakens the same if the speed of the motor is too high. As ordinarily the speed of the motor needs controlling merely in the range of lower speeds, it is advisable under certain circumstances to throw the resistances $w^2$ and $w^3$ out of operation in case of high speeds in order to avoid losses in energy. It is of course immaterial in which one of the two current supplying conductors to the motor the resistance $w^1$ of the bridge is included. If necessary additional resistances may be included in the circuit.

Claims:

1. The combination with a motor and a generator connected in circuit therewith, of a field winding for said generator, and means for compensating for the remanence of the generator.

2. The combination with a motor and a generator connected in circuit therewith, of a field winding for said generator, and automatically controlled means for compensating for the remanence of the generator.

3. The combination with a motor and a generator connected in circuit therewith, of a field winding for said generator, and means controlled by the speed of the motor for compensating for the remanence of the generator.

4. The combination with a motor and a generator connected in circuit therewith, of a field winding for said generator, and means for insuring the control of the motor speed in accordance with the excitation of the generator field furnished by said field winding.

5. The combination with a motor and a generator connected in circuit therewith, of a field winding for said generator, and means independent of the main current for insuring the control of the motor speed in accordance with the excitation of the generator field.

6. The combination with a motor and a generator connected in circuit therewith, of a field winding for said generator, means governing the generator field to vary the speed of the motor, and means for insuring the control of the motor speed in accordance with the governing means.

7. The combination with a motor and a generator connected in circuit therewith, of a field winding for said generator, and means for concurrently impressing on said field winding an electromotive force adapted to set up an exciting current in said winding, and an electromotive force proportional to the speed of said motor.

8. The combination with a motor and a generator connected in circuit therewith, of a compound field winding for said generator, and means for insuring the control of the motor speed in accordance with the main excitation of said winding.

9. The combination with a motor and a generator connected in circuit therewith, of a compound field winding for said generator, and means for impressing on the main field winding an electromotive force adapted to set up an exciting current in said winding, and an electromotive force proportional to the speed of said motor.

10. The combination with a motor and a generator connected in circuit therewith, of a field winding for said generator, and means for compensating for the remanence of the generator at the lower limits of its field excitation.

11. The combination with a motor and a generator connected in circuit therewith, of a field winding for said generator, and means for insuring the control of the voltage impressed by said generator on said motor in accordance with the excitation of said generator furnished by said field winding.

12. The combination with a motor and a generator connected in circuit therewith, of a compound field winding for said generator, and means for insuring the control of the voltage impressed by said generator on said motor in accordance with the excitation of said generator.

13. The combination with a motor and a generator connected in circuit therewith, of a field winding for said generator connected to a source of current, and an auxiliary generator driven in accordance with the speed of the motor and connected with said field winding.

14. The combination with a motor and a generator connected in circuit therewith, of a compound field winding for said generator having its main winding connected to a source of current, and an auxiliary generator driven in accordance with the speed of the motor and connected with the main field winding.

15. The combination with a motor and a generator connected in circuit therewith, of a field winding for said generator, a differtial device connected in circuit with said winding, and separate sources of current connected to said differential device.

16. The combination with a motor and a generator connected in circuit therewith, of a field winding for said generator, a differential device connected in circuit with said winding, and a source of exciting current and a source of current controlled by the speed of the motor connected to said differential device.

17. The combination with a motor and a generator connected in circuit therewith, of a field winding for said generator, and a source of exciting current and a source of controlling current acting differentially on said field winding.

18. The combination with a motor and a generator connected in circuit therewith, of a field winding for said generator, and a source of exciting current and a source of current controlled by the motor speed acting differentially on said field winding.

19. The combination with a motor and a generator connected in circuit therewith, of a field winding for said generator, and means for compensating for both the positive and negative remanance of the generator.

20. The combination with a motor and a generator connected in circuit therewith, of a field winding for said generator, and means for compensating for the remanence of the generator at various loads and speeds.

In testimony whereof I have signed my name to this specification in the presence of two subscribing witnesses.

CHRISTIAN KRÄMER.

Witnesses:
ERWIN DIPPEL,
MICHAEL POLK.